(12) United States Patent
Leal et al.

(10) Patent No.: US 12,723,376 B2
(45) Date of Patent: Sep. 1, 2026

(54) SYSTEM AND METHOD OF WORK MACHINE IMPLEMENT CONTROL FOR SUBTERRANEAN MAPPING APPLICATIONS

(71) Applicant: Deere & Company, Moline, IL (US)

(72) Inventors: Colton K. Leal, Dubuque, IA (US); Peter E. Olsen, Moline, IL (US)

(73) Assignee: Deere & Company, Moline, IL (US)

( * ) Notice: Subject to any disclaimer, the term of this patent is extended or adjusted under 35 U.S.C. 154(b) by 449 days.

(21) Appl. No.: 18/464,604

(22) Filed: Sep. 11, 2023

(65) Prior Publication Data

US 2025/0084617 A1 Mar. 13, 2025

(51) Int. Cl.

*E02F 9/26* (2006.01)
*E02F 9/20* (2006.01)
*G06T 15/00* (2011.01)

(52) U.S. Cl.

CPC .............. *E02F 9/262* (2013.01); *E02F 9/205* (2013.01); *E02F 9/2054* (2013.01); *E02F 9/265* (2013.01); *G06T 15/00* (2013.01)

(58) Field of Classification Search

CPC ......... E02F 9/262; E02F 9/205; E02F 9/2054; E02F 9/265; E02F 9/261; G06T 15/00

See application file for complete search history.

(56) References Cited

U.S. PATENT DOCUMENTS 4,945,221 A 7/1990 Nielsen et al.
5,493,798 A 2/1996 Rocke et al.
6,247,538 B1 6/2001 Takeda et al.
6,477,914 B1 11/2002 Krieger
6,736,216 B2 5/2004 Savard et al.
7,477,973 B2 1/2009 Brewer et al.

(Continued)

FOREIGN PATENT DOCUMENTS

EP 3351963 A1 7/2018
WO 2008129345 A1 10/2008
WO 2012157381 A1 11/2012

OTHER PUBLICATIONS

German Search Report issued in application No. 102024120825.2 dated Jun. 10, 2025, 16 pages.

*Primary Examiner* — Manuel L Barbee
(74) *Attorney, Agent, or Firm* — Gary L. Montle; Lucian Wayne Beavers; Patterson Intellectual Property Law, PC

(57) ABSTRACT

A work machine comprises a machine frame and at least a first implement for working a terrain, a subterranean monitoring unit and a load sensor associated with the first implement, and position sensors respectively associated with the machine frame and the at least first implement. A corresponding method includes, during a subterranean monitoring operation independent of an earth working operation, automatically controlling at least one actuator associated with the first implement to maintain contact of at least one surface of the first implement with a ground surface, the automatic control based at least in part on input signals from the load sensor corresponding to a predetermined range of load values, and generating multidimensional parameters for an electronic worksite map associated with a current location of the work machine, the parameters generated via at least input signals from the subterranean monitoring unit further corresponding with input signals from the position sensors.

20 Claims, 4 Drawing Sheets

(56) References Cited

U.S. PATENT DOCUMENTS 7,934,329 B2 5/2011 Mintah et al.
8,141,650 B2 3/2012 Breiner et al.
8,180,532 B2 5/2012 O'Halloran et al.
8,634,991 B2 1/2014 Douglas
8,689,471 B2 4/2014 Carpenter et al.
8,817,238 B2 8/2014 Montgomery
8,919,455 B2 12/2014 Hendron et al.
9,074,546 B2 7/2015 Asami et al.
9,187,879 B2 11/2015 Suk
9,234,329 B2 1/2016 Jaliwala et al.
9,328,479 B1 5/2016 Rausch et al.
9,428,885 B2 8/2016 Nau
9,551,115 B2 1/2017 Engels et al.
9,551,130 B2 1/2017 Hendron et al.
9,581,691 B2 2/2017 Simicevic et al.
9,624,643 B2 4/2017 Hendron et al.
9,638,525 B1 5/2017 Willis
9,976,285 B2 5/2018 Padilla
9,995,016 B1 6/2018 Howell et al.
10,094,654 B2 10/2018 Crozier et al.
10,401,176 B2 9/2019 Nackers et al.
10,532,741 B2 1/2020 Kean et al.
10,704,233 B2 7/2020 Dusha
10,883,248 B2 1/2021 Stotlar
11,085,170 B2 8/2021 Roulston et al.
11,414,839 B2 8/2022 Shintani et al.
11,746,501 B1 * 9/2023 Gajić .................... G06V 20/64
701/27
2008/0047170 A1 2/2008 Nichols
2011/0311342 A1 12/2011 Montgomery
2013/0080112 A1 3/2013 Friend
2013/0103247 A1 4/2013 Ogawa et al.
2014/0168009 A1 6/2014 Peake
2014/0343800 A1 11/2014 Nelson et al.
2016/0003171 A1 1/2016 Ge
2016/0258128 A1 9/2016 Nakamura et al.
2019/0100205 A1 4/2019 Kean et al.
2019/0234045 A1 8/2019 Wiewel et al.
2020/0042023 A1 2/2020 Garvin et al.
2020/0281107 A1 * 9/2020 Stanhope ............... A01B 79/02
2020/0299924 A1 * 9/2020 Kurokawa ............ E02F 9/2033
2020/0349760 A1 11/2020 Hendron
2021/0094535 A1 4/2021 Thompson
2021/0189667 A1 6/2021 Fritz
2022/0347851 A1 * 11/2022 Augenbraun .......... B25J 9/1694

* cited by examiner

SYSTEM AND METHOD OF WORK MACHINE IMPLEMENT CONTROL FOR SUBTERRANEAN MAPPING APPLICATIONS

FIELD OF THE DISCLOSURE

The present disclosure relates generally to work machines having subterranean monitoring capabilities, and more particularly systems and methods for facilitating subterranean mapping of a worksite using for example work machines such as excavators having ground penetrating radar capabilities.

BACKGROUND

Work operations in worksites may frequently involve ground disturbing operations in which the ground adjacent or under the machines is excavated, scraped, or otherwise disturbed. A number of different problems can arise in performing these types of operations. For instance, there may be items underground which will be destroyed by the ground disturbing operation. By way of example, there may be underground pipes, tiles, utilities (such as wires, fiber optic cables, etc.) buried under the ground to be disturbed. When the ground disturbing operation is performed (such as an excavation) the excavation may damage or destroy these items. Repairs can be time consuming and expensive. Similarly, where the item that is damaged is hazardous (such as a gas line), damaging the item may be dangerous for operators and equipment in the vicinity of the operation.

Various examples of systems and methods for worksite analysis using subterranean monitoring technology, including but not limited to ground penetrating radar (GPR) systems and techniques, are conventionally known. In one example, a worker pushes and/or pulls a GPR-equipped cart across a workspace, wherein inconsistencies in the ground beneath the cart can be identified and visualized from the output data. The detection locations are marked with paint on the ground, but the depth is usually not indicated to such machine operators.

Some work machines such as excavators and backhoes are also known to have GPR-equipped work implements such as buckets which can perform substantially the same task described above for manually driven carts, but with the implement movement for example being hydraulically actuated via user interface tools from a cab.

In one conventional example, the bucket is set flat on the ground and the bucket start position is manually marked using paint or an equivalent. Upon initiation of the scans by an operator, for example using a display unit as a user interface tool, the operator further drags the bucket (e.g., in a linear and/or radial fashion) across the ground surface, preferably maintaining constant contact and speed, while keeping the bucket as level as possible. When the process is completed, for example as indicated by the machine operator via the display unit, the bucket end position may be marked, again manually using paint or an equivalent. Detection positions may be indicated on the display unit, for example using coordinates and/or with GPR results. The excavator operator typically shouts the detected positions out to other workers external to the work machine, who mark them on the ground surface, again with paint or an equivalent.

One problem with such a technique is that the operator conventionally maintains the bucket (or other relevant implement including the GPR sensors) in constant contact with the ground surface during the dragging/scanning process by visual and feel. When constant contact is not maintained, the scan provides bad data and must be repeated. To compensate, the operator tends to over-apply pressure to the point that the front of the machine begins lifting off the ground. Over time, this can understandably be stressful on machine components.

Another problem is that during the scanning process, the operator is trying to maintain constant contact while scanning a useful amount of workspace. There are no indicators provided when constant contact is not maintained, and taking longer passes allows for more opportunities for the operator to make a mistake and ruin the entire data set. It would be desirable to enable the operator to maximize the sweep length, and further reduce or even eliminate the operator's need to focus on the sweeping motion while executing the scan.

BRIEF SUMMARY

The current disclosure provides enhancements to conventional systems utilizing GPR techniques for subterranean worksite mapping, at least in part by addressing one or more problems as noted above.

In one particular and exemplary embodiment, a method is disclosed herein for operating a work machine comprising a machine frame and at least a first implement for working a terrain, the work machine comprising a subterranean monitoring unit and a load sensor associated with the first implement, and one or more position sensors respectively associated with the machine frame and the at least first implement. During a subterranean monitoring operation, independent of an earth working operation of the first implement, the method includes automatically controlling at least one actuator associated with the first implement to maintain contact of at least one surface of the first implement with a ground surface, the automatic control based at least in part on input signals from the load sensor corresponding to a predetermined range of load values, and generating multidimensional parameters for an electronic worksite map associated with a current location of the work machine, the parameters generated via at least input signals from the subterranean monitoring unit further corresponding with input signals from the one or more position sensors.

In one exemplary aspect according to the above-referenced embodiment, the method includes determining one or more position characteristics of the first implement by fusing input signals from the position sensor associated with the first implement with position signals from the position sensor associated with the main frame in a coordinate system independent of a global navigation frame for the map, and generating the multidimensional parameters at least in part by converting the determined one or more position characteristics of the first implement into coordinates associated with the global navigation frame.

In another exemplary aspect according to the above-referenced embodiment and optional aspects, the method may include defining a reference position for the first implement during the subterranean monitoring operation, and returning the first implement to the defined reference position at an end of each subsequent sweep performed during the subterranean monitoring operation.

The reference position may for example be defined in the coordinate system independent of the global navigation frame.

The reference position may for example be defined from user input corresponding to a current position of the first implement, wherein each subsequent sweep is automatically performed at a substantially constant travel speed by the first implement across the ground surface from a respective starting position back to the reference position.

In another exemplary aspect according to the above-referenced embodiment and optional aspects, the parameters may be generated in association with determined subterranean conditions as mapped to locations in at least two dimensions with respect to a worksite map display on a display unit visible to an operator of the work machine.

In another exemplary aspect according to the above-referenced embodiment and optional aspects, an electronic worksite map associated with the current location of the work machine from prior to the subterranean monitoring operation may be updated based at least in part on the generated multidimensional parameters during the subterranean monitoring operation.

In another exemplary aspect according to the above-referenced embodiment and optional aspects, the updated electronic worksite map may be uploaded to a remote data storage by a first work machine performing the subterranean monitoring operation, and retrievable by at least a second work machine performing an earth working operation in association with the worksite.

In another exemplary aspect according to the above-referenced embodiment and optional aspects, the determined subterranean conditions may be mapped to locations in three dimensions with respect to the updated electronic worksite map. The method may further include automatically controlling one or more actuators in association with the earth working operation and based on at least one determined subterranean condition.

In another exemplary aspect according to the above-referenced embodiment and optional aspects, a first image layer may be generated on a display unit associated with the at least second work machine, based on images captured from one or more imaging devices mounted on the at least second work machine, and a second image layer may be superimposed on the first image layer comprising indicia associated with at least one determined subterranean condition and at a respective location within a field of view of the captured images.

In another embodiment as disclosed herein, a work machine may be provided comprising a machine frame and at least a first implement for working a terrain, the work machine comprising a subterranean monitoring unit and a load sensor associated with the first implement, and one or more position sensors respectively associated with the machine frame and the at least first implement. The work machine further comprises a controller, which may for example be a discrete controller or otherwise integrated with a vehicle control unit or the equivalent, and which is configured to direct the performance of steps in accordance with the above-referenced method embodiment and optionally one or more above-referenced aspects thereof.

In another embodiment as disclosed herein, a system may be provided including one or more processors, for example distributed among a cloud computing platform or the equivalent, and/or across one or more work machines associated with a worksite. The one or more processors may collectively be configured to direct the performance of steps in accordance with the above-referenced method embodiment and optionally one or more above-referenced aspects thereof, for example but without limitation directing the performance of subterranean monitoring operations via at least a first work machine and further directing at least some portions of an earth working operation via at least a second work machine and based at least in part on an updated worksite map produced via the subterranean monitoring operation.

Numerous objects, features, and advantages of the embodiments set forth herein will be readily apparent to those skilled in the art upon reading of the following disclosure when taken in conjunction with the accompanying drawings.

DETAILED DESCRIPTION

Figure 1:
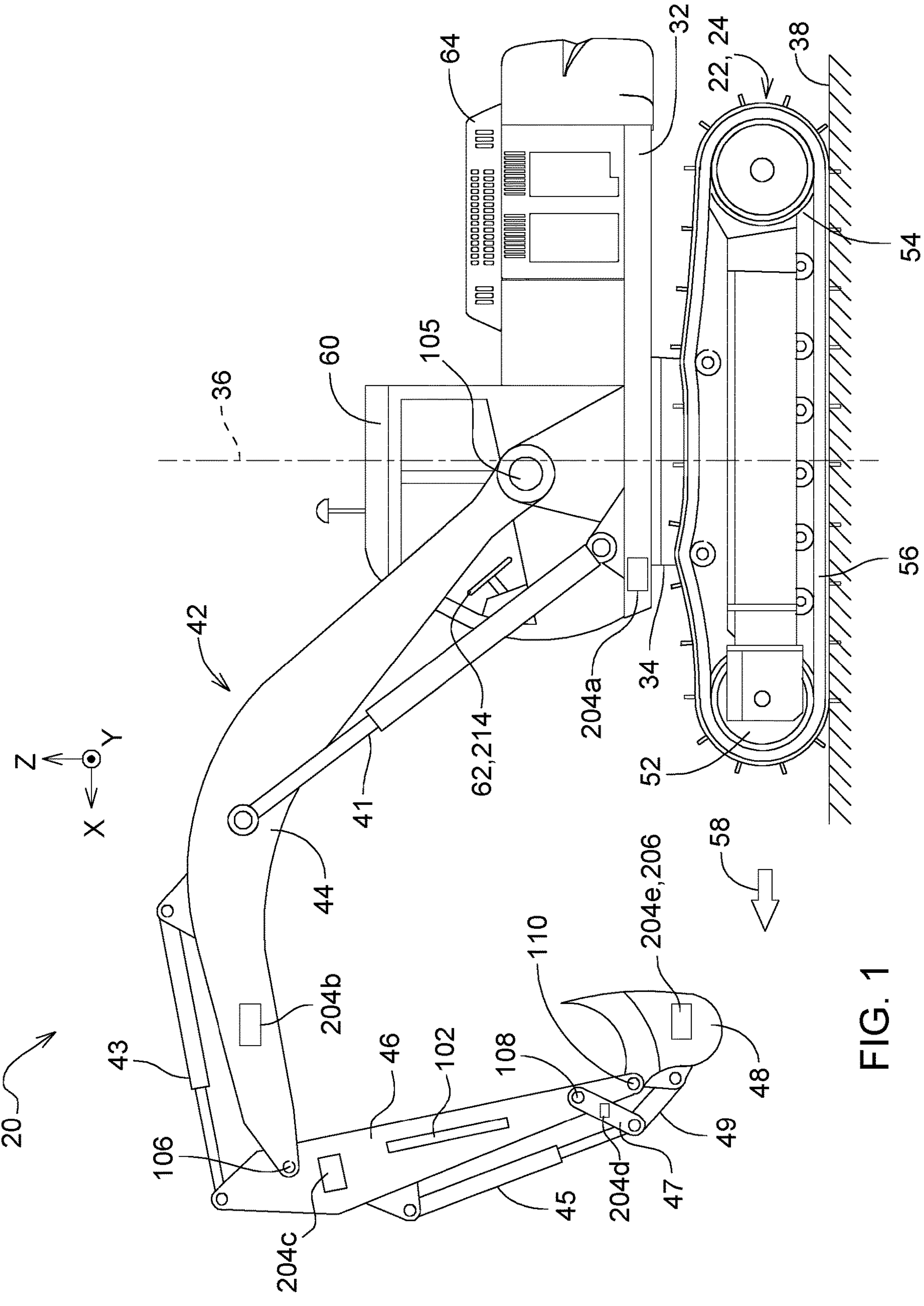
FIG. 1 is a side view representing an excavator as an exemplary work machine according to an embodiment of the present disclosure.

FIG. 1 depicts a representative self-propelled work machine 20 in the form of, for example, a tracked excavator machine but other suitable work machines for working terrain may fall within the scope of the present disclosure unless otherwise stated. The work machine 20 includes an undercarriage 22 with first and second ground engaging units 24 and further including first and second travel motors (not shown) for driving the first and second ground engaging units 24, respectively. A main frame 32 is supported from the undercarriage 22 by a swing bearing 34 such that the main frame 32 is pivotable about a pivot axis 36 relative to the undercarriage 22. The pivot axis 36 is substantially vertical when a ground surface 38 engaged by the ground engaging units 24 is substantially horizontal. A swing motor (not shown) is configured to pivot the main frame 32 on the swing bearing 34 about the pivot axis 36 relative to the undercarriage 22.

In an embodiment, a swing angle sensor (not shown) may include an upper sensor part mounted on the main frame 32 and a lower sensor part mounted on the undercarriage 22. Such a swing angle sensor may be configured to provide a swing (or pivot) angle signal corresponding to a pivot position of the main frame 32 relative to the undercarriage 22 about the pivot axis 36. The swing angle sensor may for example be a Hall Effect rotational sensor including a Hall element, a rotating shaft, and a magnet, wherein as the angular position of the Hall element changes, the corresponding changes in the magnetic field result in a linear change in output voltage. Other suitable types of rotary position sensors include rotary potentiometers, resolvers, optical encoders, inductive sensors, and the like.

A work implement 42 in the context of the referenced work machine 20 is a boom assembly having numerous components in the form of a boom 44 pivotably connected to the main frame 32 at a linkage joint 105, an arm 46 pivotally connected to the boom 44 at a linkage joint 106, and a working tool 48. The boom 44 is pivotally attached to the main frame 32 to pivot about a generally horizontal axis relative to the main frame 32. The working tool 48 in this embodiment is an excavator shovel, which is pivotally connected to the arm 46 at a linkage joint 110. One end of a dogbone 47 is pivotally connected to the arm 46 at a linkage joint, and another end of the dogbone 47 is pivotally connected to a tool link 49. A tool link 49 in the context of the referenced work machine 20 is a bucket link 49.

The boom assembly 42 extends from the main frame 32 along a working direction of the boom assembly 42. The working direction can also be described as a working direction of the boom 44. As described herein, control of the work implement 42 may relate to control of any one or more of the associated components (e.g., boom 44, arm 46, tool 48).

The first and second ground engaging units 24 as illustrated in FIG. 1 are tracked ground engaging units, but in various embodiments (not shown) may be wheels. Each of the tracked ground engaging units 24 includes a front idler 52, a drive sprocket 54, and a track chain 56 extending around the front idler 52 and the drive sprocket 54. The travel motor of each tracked ground engaging unit 24 drives its respective drive sprocket 54. Each tracked ground engaging unit 24 has a forward traveling direction 58 defined from the drive sprocket 54 toward the front idler 52. The forward traveling direction 58 of the tracked ground engaging units 24 also defines a forward traveling direction 58 of the undercarriage 22 and thus of the work machine 20.

An operator's cab 60 may be located on the main frame 32. The operator's cab 60 and the boom assembly 42 may both be mounted on the main frame 32 so that the operator's cab 60 faces in the working direction 58 of the boom assembly. A control station 62 and display unit 214 may be located in the operator's cab 60.

Also mounted on the main frame 32 is an engine 64 for powering the working machine 20. The engine 64 may be a diesel internal combustion engine. The engine 64 may drive a hydraulic pump to provide hydraulic power to the various operating systems of the work machine 20.

Figure 2:
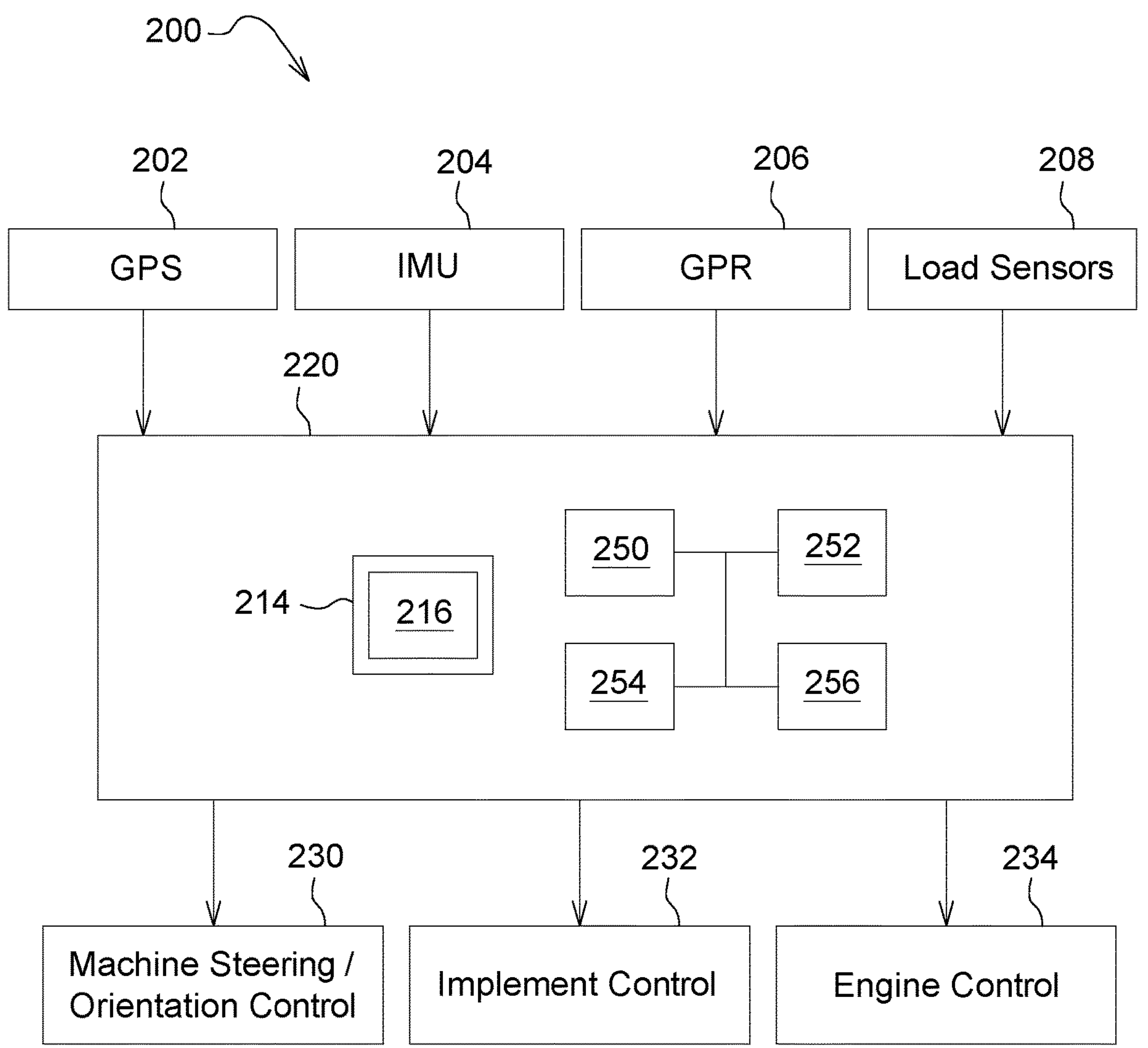
FIG. 2 is a block diagram representing an exemplary control system according to an embodiment of the present disclosure.

As schematically illustrated in FIG. 2, the work machine 20 may include a control system 200 including a controller 220. The controller 220 may be part of the machine control system of the working machine, or it may be a separate control module. The controller 220 is configured to receive input signals from some or all of sensors 202, 204, 206, 208 as further described below. Various of the sensors 202, 204, 206, 208 may typically be discrete in nature, but signals representative of more than one input parameter may be provided from the same sensor, and a sensor system 202, 204, 206, 208 as disclosed herein may further include or otherwise refer to signals provided from the machine control system.

In an embodiment machine location determining sensors 202 may include a global positioning system (GPS) transceiver. Machine location determining sensors 202 may additionally or in the alternative include for example ground speed sensors, steering sensors, or the like, or equivalent inputs from the machine control system.

Work implement position sensors 204 in an embodiment as represented in FIG. 1 may include a set of inertial navigation system (INS) sensors mounted on the work machine 20, as represented generally including multiple sensors 204*a*, 204*b*, 204*c*, 204*d*, 204*e* respectively mounted to the main frame 32, the boom 44, the arm 46, the dogbone 47, and the tool 48. Alternative embodiments of work implement position sensors 204 may include rotary pin encoders mounted at pivot pins to detect the relative rotational positions of the respective components, linear encoders mounted on hydraulic cylinders to detect the respective extensions thereof, and the like.

Respective sensors may for example be mounted on opposing sides of at least one linkage joint. An opposing side of the at least one linkage joint may be ascertained by mounting or affixation of the work implement position sensors 204 on either side of the at least one linkage joint, which is defined as a pivotal linkage joint connecting the one or more components of the work implement 42.

The work implement position sensors 204 may be oriented in an x-, y-, and z-axis coordinate system. Using as one example the sensor 204*c* as mounted on the arm 46 and the sensor 204*d* as mounted on the dogbone 47, respective body frames of the work implement position sensors 204*c* and 204*d* (not shown) may be mounted such that the x-axes of the aforementioned body frames point along the direction of the work implement 42. Alternatively, the body frame of the sensor 204*c* and the body frame of the sensor 204*d* may be mounted in a manner such that the z-axes of the aforementioned body frames point in the direction of the main frame 32 of the work machine 20 (i.e., the excavator). Because an x-, y-, and z-axis coordinate system may be defined arbitrarily, the foregoing are not intended as limiting. The x-, y-, and z-axis coordinate system, though it may be defined arbitrarily, relates to the mechanical axes of rotation for roll (i.e., rotation about the x-axis), pitch (i.e., rotation about the y-axis), and yaw (i.e., rotation about the z-axis).

Some or all of the work implement position sensors 204 in the context of the referenced work machine 20 may include inertial measurement units (each, an IMU). IMUs are tools that capture a variety of motion- and position-based measurements, including, but not limited to, velocity, acceleration, angular velocity, and angular acceleration.

IMUs may include a number of sensors including, but not limited to, accelerometers, which measure (among other things) velocity and acceleration, gyroscopes, which measure (among other things) angular velocity and angular acceleration, and magnetometers, which measure (among other things) strength and direction of a magnetic field. Generally, an accelerometer provides measurements, with respect to (among other things) force due to gravity, while a gyroscope provides measurements, with respect to (among other things) rigid body motion. The magnetometer provides measurements of the strength and the direction of the magnetic field, with respect to (among other things) known internal constants, or with respect to a known, accurately measured magnetic field. The magnetometer provides measurements of a magnetic field to yield information on positional, or angular, orientation of the IMU; similarly to that of the magnetometer, the gyroscope yields information on a positional, or angular, orientation of the IMU. Accordingly, the magnetometer may be used in lieu of the gyroscope, or in combination with the gyroscope, and complementary to the accelerometer, in order to produce local information and coordinates on the position, motion, and orientation of the IMU.

As conventionally known in the art, an accelerometer is an electro-mechanical device or tool used to measure acceleration ($m/s^2$), which is defined as the rate of change of velocity (m/s) of an object. Accelerometers sense either static forces (e.g., gravity) or dynamic forces of acceleration (e.g., vibration and movement). An accelerometer may receive sense elements measuring the force due to gravity. By measuring the quantity of static acceleration due to gravity of the Earth, an accelerometer may provide data as to the angle the object is tilted with respect to the Earth, the angle of which may be established in an x-, y-, and z-axis coordinate frame. However, where the object is accelerating in a particular direction, such that the acceleration is dynamic (as opposed to static), the accelerometer produces data which does not effectively distinguish the dynamic forces of motion from the force due to gravity by the Earth. Also as conventionally known in the art, a gyroscope is a device used to measure changes in orientation, based upon the object's angular velocity (rad/s) or angular acceleration (rad/$s^2$). A gyroscope may constitute a mechanical gyroscope, a micro-electro-mechanical system (MEMS) gyroscope, a ring laser gyroscope, a fiber-optic gyroscope, and/or other gyroscopes as are known in the art. Principally, a gyroscope is employed to measure changes in angular position of an object in motion, the angular position of which may be established in an x-, y-, and z-axis coordinate frame.

In an embodiment, for each of at least one linkage joint as referenced above, sense elements from the received work implement position sensor output signals may be fused in an independent coordinate frame associated at least in part with the respective linkage joint, the independent coordinate frame of which is independent of a global navigation frame for the work machine 20, wherein for example measurements received by work implement position sensors 204 may be merged to produce a desired output in the work implement 42 of the work machine 20. Accordingly, transformation of the sense elements of received output signals, measured for example by the gyroscopes and the accelerometers in the sensor system 204, may be effectuated using the acceleration measurements and the angular velocity measurements for a joint center of the respective linkage joint, and in an embodiment movement of one or more implement components (e.g., arm, boom, bucket) may be controlled or directed based at least in part on at least one tracked joint characteristic, such as a joint angle, for the respective linkage joint.

As also referenced in FIG. 1, a subterranean monitoring unit 206 may preferably include a GPR unit 206. A GPR unit 206 may for example include a sensor such as a transducer mounted on a work implement (e.g., bucket) and preferably configured to produce signals representative of objects such as utility pipes within the ground when at least one surface of the bucket selectively engages the ground surface. The GPR unit 206 may further include a transmitter, transceiver, and/or the like for communication with, e.g., the controller 220.

One or more load sensors 208 may also be provided and functionally linked to the controller 220. Load sensors 208 may for example include strain gauges or a variety of other types of sensors as used in the art to indicate pressure associated with a work implement (e.g., bucket), such as for example whether or how much of a load is being carried by the bucket.

The controller 220 may be configured to produce outputs, as further described below, to a user interface 214 for display to the human operator or other appropriate user. The controller 220 may be configured to receive inputs from the user interface 214, such as user input provided via the user interface 214. Not specifically represented in FIG. 2, the controller 220 of the work machine 20 may in some embodiments further receive inputs from and generate outputs to remote devices associated with a user via a respective user interface, for example a display unit with touchscreen interface. Data transmission between for example a vehicle control system and a remote user interface may take the form of a wireless communications system and associated components as are conventionally known in the art. In certain embodiments, a remote user interface and vehicle control systems for respective work machines 20 may be further coordinated or otherwise interact with a remote server or other computing device for the performance of operations in a system as disclosed herein.

The controller 220 may further, or in the alternative, be configured to generate control signals for controlling the operation of respective actuators, or signals for indirect control via intermediate control units, associated with a machine steering control system 230, a machine implement control system 232, and/or an engine speed control system 234. The control systems 230, 232, 234 may be independent or otherwise integrated together or as part of a machine control unit in various manners as known in the art. The controller 220 may, for example, generate control signals for controlling the operation of various actuators, such as hydraulic motors or hydraulic piston-cylinder units 41, 43, 45, and electronic control signals from the controller 220 may actually be received by electro-hydraulic control valves associated with the actuators such that the electro-hydraulic control valves will control the flow of hydraulic fluid to and from the respective hydraulic actuators to control the actuation thereof in response to the control signal from the controller 220. In an embodiment, the controller 220 may in the context of a control operation further receive a pivot angle signal from a pivot angle sensor as described above and selectively drive a swing motor automatically to rotate the main frame 32 about the pivot axis 36 relative to the undercarriage 22 to a target pivot position of the main frame 32 relative to the undercarriage 22, as part of an aforementioned control unit 230, 232, 234 or optionally as a separate and/or integrated control unit within the scope of the present disclosure.

The controller 220 may include, or be associated with, a processor 250, a computer readable medium 252, a communication unit 254, data storage 256 such as for example a database network, and the aforementioned user interface 214 or control panel having a display 216. An input/output device, such as a keyboard, touch screen, or other user interface tool may be coupled to the controller 220 via the user interface 214 so that the human operator may input instructions to the controller 220.

It is understood that the controller 220 described herein may be a single controller having all of the described functionality, or it may include multiple controllers wherein the described functionality is distributed among the multiple controllers.

Various "computer-implemented" operations, steps or algorithms as described in connection with the controller 220 or alternative but equivalent computing devices or systems can be embodied directly in hardware, in a computer program product such as a software module executed by the processor 250, or in a combination of the two. The computer program product can reside in RAM memory, flash memory, ROM memory, EPROM memory, EEPROM memory, registers, hard disk, a removable disk, or any other form of computer-readable medium 252 known in the art. An exemplary computer-readable medium 252 can be coupled to the processor 250 such that the processor 250 can read information from, and write information to, the memory/storage medium 252. In the alternative, the medium 252 can be integral to the processor 250. The processor 250 and the medium 252 can reside in an application specific integrated circuit (ASIC). The ASIC can reside in a user terminal. In the alternative, the processor 250 and the medium 252 can reside as discrete components in a user terminal.

The term "processor" 250 as used herein may refer to at least general-purpose or specific-purpose processing devices and/or logic as may be understood by one of skill in the art, including but not limited to a microprocessor, a microcontroller, a state machine, and the like. A processor 250 can also be implemented as a combination of computing devices, e.g., a combination of a digital signal processor (DSP) and a microprocessor, a plurality of microprocessors, one or more microprocessors in conjunction with a DSP core, or any other such configuration.

The communication unit 254 may support or provide communications between the controller 220 and external systems or devices, and/or support or provide communication interface with respect to internal components of the self-propelled work machine 20. The communications unit 254 may include wireless communication system components (e.g., via cellular modem, WiFi, Bluetooth, or the like) and/or may include one or more wired communications terminals such as universal serial bus ports.

The data storage 256 as further described below may, unless otherwise stated, generally encompass hardware such as volatile or non-volatile storage devices, drives, memory, or other storage media, as well as one or more databases residing thereon.

Figure 3:
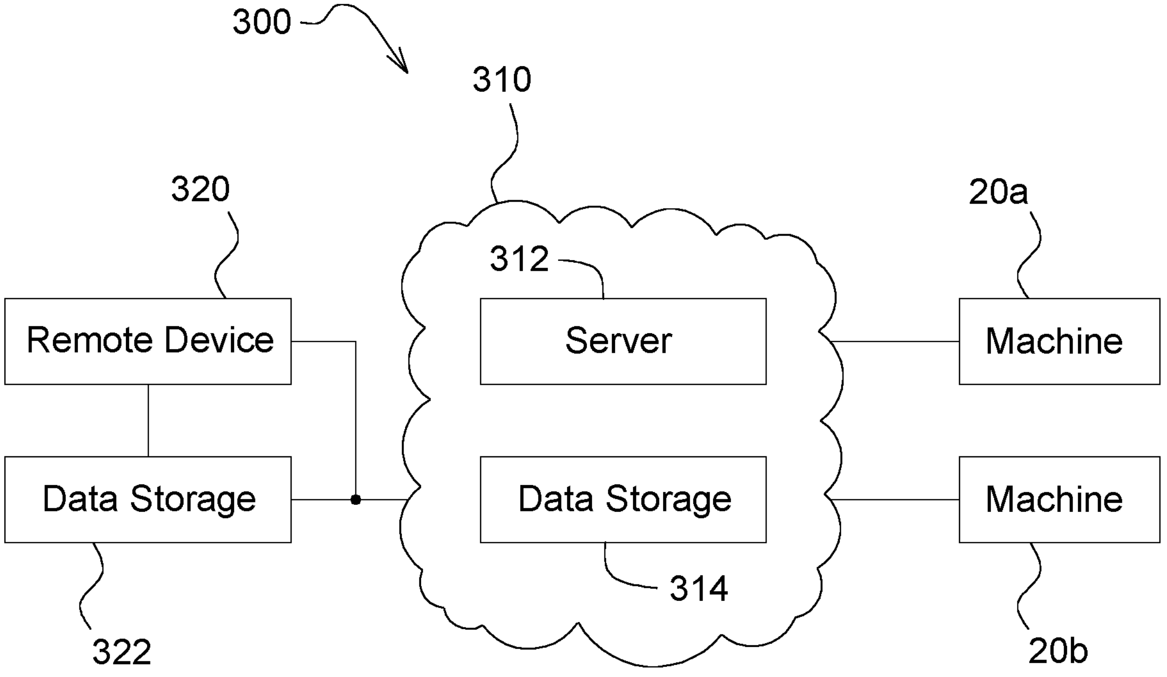
FIG. 3 is a block diagram representing a system for coordinating or otherwise communicating with a plurality of work machines associated with a work area.

As noted above, various operations as disclosed herein, for example relating to subterranean monitoring operations, earth working operations, and the like, may be executed via a controller 220 for a given work machine 20, wherein the controller may be a discrete device or integrated with a vehicle control system or equivalent. As further represented in FIG. 3, in various embodiments as disclosed herein operations may further or in the alternative be executed via a distributed system 300 including one or more remote processors, such as servers 312 in a cloud platform 310 or other computing devices 320 such as for example hosted servers or mobile user devices, independently or in association with a local controller 220 for each of one or more work machines 20*a*, 20*b*. Each remote processor 312, 320 may be respectively or collectively associated with cloud data storage 314 or distributed data storage 322 having for example electronic worksite maps, worksite planning information, work machine information, and the like retrievably stored thereon and collectively accessible for execution of the operations as disclosed herein.

Figure 4:
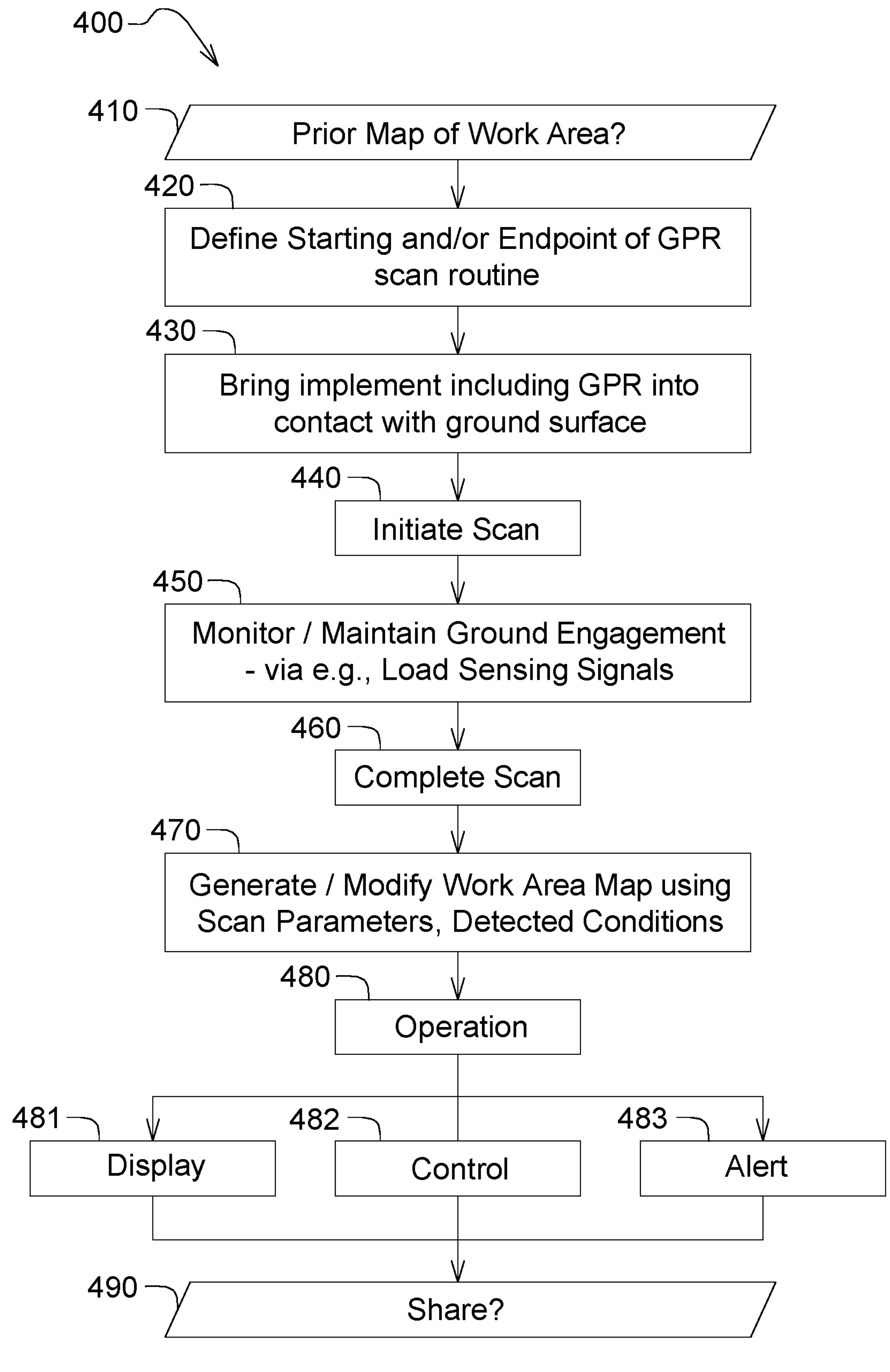
FIG. 4 is a flowchart representing an exemplary embodiment of a method as disclosed herein.

In FIG. 4, the depicted flowchart represents an exemplary embodiment of a method 400 for operating one or more work machines in association with subterranean monitoring of a work site. In embodiments as described below the work machines are excavators, with at least a first excavator having a subterranean monitoring unit (e.g., including ground penetrating radar) mounted on or integrated into its earth working implement (bucket), but alternative work machines and implements are within the scope of alternative embodiments.

At least a first work machine according to the method 400 may be configured to perform at least a subterranean monitoring operation, independent of an earth working operation of the bucket. In some embodiments, for example, subterranean monitoring operations may be performed by a single excavator which updates a worksite map for the benefit of one or more additional work machines and earth working operations performed in the worksite by the work machines.

The method 400 may begin, for example in association with a subterranean monitoring operation with respect to a first work machine, with retrieval of an existing electronic worksite map (step 410). Retrieval of the existing worksite map may be performed upon initiation of the subterranean monitoring operation, as a trigger for initiating the subterranean monitoring operation, or in some cases not at all wherein for example an electronic worksite map is to be generated as part of the subterranean monitoring operation.

As represented in FIG. 4, the subterranean monitoring operation includes defining a starting point and/or ending point of a sweep (step 420), prompting the operator to bring a surface of the bucket including the subterranean monitoring unit into contact with the ground surface (step 430), or automatically executing such a step for example with respect to a defined starting point, and initiation an automated sweep (e.g., having a linear and/or radial motion with respect the main frame of the work machine) including scanning, imaging, etc., via the subterranean monitoring unit (step 440). In various embodiments, steps 420 to 440 may be executed in a different order, or individual ones of the steps may be omitted or combined with other steps. For example, defining of a starting point may be integrated with placement of the bucket in contact with the ground surface at the starting point, wherein steps 420 and 430 are combined.

Upon initiation of a sweep, which may for example be performed at a constant speed, the method 400 includes automatically controlling at least one actuator associated with the bucket to maintain contact with the ground surface, substantially throughout the sweep (step 450). Such a controlled maintenance of contact between the bucket and the ground surface may preferably avoid making data from the corresponding scan invalid, and further prevent the operator from overcompensating by applying too much load and being harder than necessary on the machine.

A constant speed of an automated sweep may be dependent on numerous contextual variables, and may for example be between 0.5 meters per second and 2.0 meters per second for a particular excavator configuration.

The automatic control may for example be provided using input signals from a load sensor associated with the bucket, as corresponding to a predetermined range of contact force values. Such a range of contact force values may also be dependent on numerous contextual variables, and the scope of the present disclosure is not intended as being limited with respect to any specific automated speed at which the bucket is dragged through a sweep, or any specific range of contact force values for maintaining contact with the ground surface. One of skill in the art may identify, for a given work machine and application, an appropriate minimum contact force (load) value above zero (wherein no pressure would otherwise be applied to the ground) and an appropriate maximum contact force (load) value (wherein too much pressure is applied to the ground, to the point that the front of the work machine may even be lifted off the ground), Upon completing a scan of an area corresponding to the above-referenced sweep (step 460), the method 400 may continue by generating an electronic worksite map based at least in part on the subterranean monitoring operation (step 470), or in the context where an existing worksite map was initially retrieved step 470 may include updating the electronic worksite map based at least in part on the subterranean monitoring operation. For example, multidimensional parameters may be generated for the electronic worksite map, with two coordinates (x, y) being associated with a current location of the work machine (e.g., a location of the bucket) as determined based on input signals from one or more position sensors, and in some embodiments with information for a third coordinate (z) as corresponding to the x, y location being based at least in part on input signals from the subterranean monitoring unit.

In an embodiment, one or more position characteristics of the bucket including the subterranean monitoring unit may be obtained in part by fusing input signals from the position sensor (e.g., IMU) associated with the bucket with position signals from the position sensor (e.g., IMU) associated with the main frame in a coordinate system independent of a global navigation frame for the map, further wherein the multidimensional parameters are generated at least in part by converting the one or more position characteristics of the bucket into coordinates associated with the global navigation frame.

Completion of a current sweep may be defined upon return to an end point or other reference position as previously determined in step 420, in which case the method 400 may return to step 430 with movement of the bucket to another starting point for a subsequent sweep. Alternatively, if a starting point was determined as a reference position in step 420, upon completion of a current sweep the work machine may be configured to automatically return to the reference position. In this context completion of a current sweep may be determined based on specified parameters for a sweep (e.g., detected time and/or distance), and/or manual termination of a sweep.

In various embodiments, either or both of a starting reference point or an ending reference point for subterranean monitoring sweeps may be used-defined via a user interface. For example, a reference point may be defined at a current position of the bucket based on a corresponding user input to identify and store that location. In another example, a user may provide user input corresponding to coordinates on a worksite map, touch screen inputs on a display of the worksite, etc., which may be converted to a reference point for subsequent subterranean monitoring sweeps.

As alluded to above, the need in conventional subterranean monitoring applications for longer sweeps in order to scan a useful amount of space yields increased opportunity for operator error by failing to maintain contact throughout the sweep, thereby ruining the entire data set. By pairing a bucket including position sensors and a subterranean monitoring unit as disclosed herein with tool tip projections and work machine joint control to enable consistent return of the bucket to the same reference point, relative for example to the work machine origin, and at a constant speed regardless of the chosen start position, the operator may be able to maximize or otherwise optimize the length of sweeps as desired. Embodiments of a system and method as disclosed herein further eliminate or at least substantially mitigate the need of the operator to consistently focus on the sweeping motion of the work implement while executing other aspects of the subterranean monitoring operation.

It is also noted that conventional subterranean monitoring applications fail to persistently maintain and apply knowledge of the scans. Embodiments of a system and method as disclosed herein, pairing a bucket including position sensors and a subterranean monitoring unit as disclosed herein with tool tip projections and position sensors on the work machine to preserve a stored log of scanned locations and subterranean objects, conditions, and the like. The same location, for example identified as latitude and longitude (x, y coordinates) in a global coordinate frame can then be referenced by the work machine having performed the subterranean monitoring operation, or another work machine as discussed below for performing later earth working operations, and further correlated with the subterranean objects, conditions, and the like. In some embodiments, a detected depth coordinate (z) may be associated with the subterranean objects, conditions, and the like. This may for example enable work machines that are not themselves equipped with subterranean monitoring units to nonetheless utilize the information obtained by the first work machine (having performed the subterranean monitoring operation), further enabling the respective work machine operators to observe detected subterranean conditions without leaving the cab, or having other workers on standby to apply paint markers, etc.

Upon completion of a subterranean monitoring operation, for example all sweeps as needed to generate the desired subterranean monitoring data for worksite map generation or updating, the method 400 may for example proceed with an earth working operation (step 480) or a subsequent subterranean monitoring operation for an alternative work area (i.e., return to step 410). The earth working operation may be performed by the same work machine 20 having performed the subterranean monitoring operation, using the generated or updated electronic worksite map which may for example be stored locally on the work machine 20 or remotely but accessible by the controller 220.

In an embodiment, the generated or updated electronic worksite map may be displayed (step 481) during the earth working operation on a display unit accessible to an operator of the work machine 20. The map may for example include a typical overhead view of the worksite along with notes, indicia, or the like with respect to a detected subterranean object or condition at specified coordinates.

In another example, the display may take the form of a first image layer on an operator display unit which appears as conventional images captured by imaging devices (e.g., cameras) having fields of view extending from the work machine 20 and into the work area. A second image layer may be generated to be superimposed with respect to the first image layer, such that the first image layer is still readily visible to the operator but notes, indicia, or other parameters corresponding to detected subterranean objects, conditions, or the like are also displayed. As the image layers may be perspective views of the work area rather than overhead (e.g., bird's eye) views, three-dimensional coordinates from the generated or updated worksite map corresponding to detected subterranean objects, conditions, or the like may require conversion to determine appropriate locations within the perspective view for appropriately displaying the notes, indicia, or other parameters or otherwise representing a current distance between (for example) the bucket or main frame of the work vehicle and any subterranean objects or conditions of note.

Such enhanced display applications as disclosed herein may have a particular advantage of enhanced visualizing of radial scan results. Such results in conventional applications tend to be provided in a combination of radial coordinates, which operators frequently find too inconvenient to justify the radial scans.

In another example, in addition or in the alternative to the display function in step 481, the method 400 may include automatic control (step 482) of one or more actuators in association with the earth working operation and based on at least one determined subterranean condition, such as for example to maintain a minimum distance between the bucket and any (or specific examples of) subterranean objects.

In another example, in addition or in the alternative to the display function in step 481 and/or the automatic control in step 482, the method 400 may include alert functions (step 483) based on at least one determined subterranean condition, such as for example to provide audible or visual notifications when a detected or predicted distance between the bucket and any (or specific examples of) subterranean objects is at or below a defined threshold.

As noted above, the earth working operation may be performed by the same work machine 20 having performed the subterranean monitoring operation and generated or updated the electronic worksite map. An earth working operation may further or alternatively be performed by a different work machine 20*b* using a shared version of the generated or updated electronic worksite map, for example where the map has been uploaded to a remote data storage (e.g., cloud-based) by the work machine 20*a* having performed the subterranean monitoring operation (step 490), and is retrievable from the remote data storage by the work machine 20*b*. This may be advantageous for work machines 20*b* lacking subterranean monitoring features of their own, and particularly where three-dimensional subterranean feature coordinates can be referenced for display and/or control purpose.

For example, not only will work machine operators be able to see where the subterranean feature detections are without having additional laborers on standby to apply paint markers, but such scanned and referenceable data are not limited to simple markings with respect to one plane (the ground) and instead allow for more complex visuals of where the detections are and what they represent. Systems and methods according to the present disclosure further allow for automated machine functionality/warnings/stops based on the proximity of the machine's tool tip location relative to the detection locations, in a manner that would otherwise be entirely unavailable to work machines lacking subterranean monitoring units (e.g., ground penetrating radar).

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item Band item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of operating a work machine comprising a machine frame and at least a first implement for working a terrain, the work machine comprising a subterranean monitoring unit and a load sensor associated with the first implement, and one or more position sensors respectively associated with the machine frame and the at least first implement, the method comprising:

during a subterranean monitoring operation, independent of an earth working operation of the first implement:

automatically controlling at least one actuator associated with the first implement to maintain contact of at least one surface of the first implement with a ground surface, the automatic control based at least in part on input signals from the load sensor corresponding to a predetermined range of load values; and generating multidimensional parameters for an electronic worksite map associated with a current location of the work machine, the parameters generated via at least input signals from the subterranean monitoring unit further corresponding with input signals from the one or more position sensors.

2. The method of claim 1, further comprising:

determining one or more position characteristics of the first implement by fusing input signals from the position sensor associated with the first implement with position signals from the position sensor associated with the main frame in a coordinate system independent of a global navigation frame for the map; and generating the multidimensional parameters at least in part by converting the determined one or more position characteristics of the first implement into coordinates associated with the global navigation frame.

3. The method of claim 2, comprising defining a reference position for the first implement during the subterranean monitoring operation, and returning the first implement to the defined reference position at an end of each subsequent sweep performed during the subterranean monitoring operation.

4. The method of claim 3, wherein the reference position is defined in the coordinate system independent of the global navigation frame.

5. The method of claim 3, wherein the reference position is defined from user input corresponding to a current position of the first implement, and each subsequent sweep is automatically performed at a substantially constant travel speed by the first implement across the ground surface from a respective starting position back to the reference position.

6. The method of claim 1, wherein the parameters are generated in association with determined subterranean conditions as mapped to locations in at least two dimensions with respect to a worksite map display on a display unit visible to an operator of the work machine.

7. The method of claim 6, wherein an electronic worksite map associated with the current location of the work machine from prior to the subterranean monitoring operation is updated based at least in part on the generated multidimensional parameters during the subterranean monitoring operation.

8. The method of claim 7, wherein the updated electronic worksite map is uploaded to a remote data storage by a first work machine performing the subterranean monitoring operation, and retrievable by at least a second work machine performing an earth working operation in association with the worksite.

9. The method of claim 8, wherein the determined subterranean conditions are mapped to locations in three dimensions with respect to the updated electronic worksite map, the method further comprising automatically controlling one or more actuators in association with the earth working operation and based on at least one determined subterranean condition.

10. The method of claim 8, wherein:

a first image layer is generated on a display unit associated with the at least second work machine, based on images captured from one or more imaging devices mounted on the at least second work machine; and a second image layer is superimposed on the first image layer comprising indicia associated with at least one determined subterranean condition and at a respective location within a field of view of the captured images.

11. A work machine comprising:

a machine frame coupled to at least a first implement for working a terrain;

a subterranean monitoring unit and a load sensor associated with the first implement;

one or more position sensors respectively associated with the machine frame and the at least first implement; and a controller configured during a subterranean monitoring operation, independent of an earth working operation of the first implement, to:

automatically control at least one actuator associated with the first implement to maintain contact of at least one surface of the first implement with a ground surface, the automatic control based at least in part on input signals from the load sensor corresponding to a predetermined range of load values; and generate multidimensional parameters for an electronic worksite map associated with a current location of the work machine, the parameters generated via at least input signals from the subterranean monitoring unit further corresponding with input signals from the one or more position sensors.

12. The work machine of claim 11, wherein the controller is configured to:

determine one or more position characteristics of the first implement by fusing input signals from the position sensor associated with the first implement with position signals from the position sensor associated with the main frame in a coordinate system independent of a global navigation frame for the map; and generate the multidimensional parameters at least in part by converting the determined one or more position characteristics of the first implement into coordinates associated with the global navigation frame.

13. The work machine of claim 12, wherein the controller is configured to:

define a reference position for the first implement during the subterranean monitoring operation; and return the first implement to the defined reference position at an end of each subsequent sweep performed during the subterranean monitoring operation.

14. The work machine of claim 13, wherein the reference position is defined in the coordinate system independent of the global navigation frame.

15. The work machine of claim 13, wherein:

the reference position is defined from user input corresponding to a current position of the first implement; and each subsequent sweep is automatically performed at a substantially constant travel speed by the first implement across the ground surface from a respective starting position back to the reference position.

16. The work machine of claim 11, wherein the parameters are generated in association with determined subterranean conditions as mapped to locations in at least two dimensions with respect to a worksite map display on a display unit visible to an operator of the work machine.

17. The work machine of claim 16, wherein an electronic worksite map associated with the current location of the work machine from prior to the subterranean monitoring operation is updated based at least in part on the generated multidimensional parameters during the subterranean monitoring operation.

18. A system for mapping a worksite traversed by at least a first work machine, the at least a first work machine comprising a machine frame coupled to at least a first implement for working a terrain, a subterranean monitoring unit and a load sensor associated with the first implement, and one or more position sensors respectively associated with the machine frame and the at least first implement, the system comprising:

one or more processors residing upon or otherwise functionally linked to the at least first work machine, and configured during a subterranean monitoring operation, independent of an earth working operation of the first implement, to:

automatically control at least one actuator associated with the first implement to maintain contact of at least one surface of the first implement with a ground surface, the automatic control based at least in part on input signals from the load sensor corresponding to a predetermined range of load values; and generate multidimensional parameters for an electronic worksite map associated with a current location of the at least first work machine, the parameters generated via at least input signals from the subterranean monitoring unit further corresponding with input signals from the one or more position sensors, wherein the updated electronic worksite map is uploaded to a remote data storage by the at least first work machine performing the subterranean monitoring operation, and retrievable by at least a second work machine performing an earth working operation in association with the worksite.

19. The system of claim 18, wherein the determined subterranean conditions are mapped to locations in three dimensions with respect to the updated electronic worksite map, the one or more processors further configured to automatically control one or more actuators of the second work machine in association with the earth working operation and based on at least one determined subterranean condition.

20. The system of claim 18, wherein:

a first image layer is generated on a display unit associated with the at least second work machine, based on images captured from one or more imaging devices mounted on the at least second work machine; and a second image layer is superimposed on the first image layer comprising indicia associated with at least one determined subterranean condition and at a respective location within a field of view of the captured images.

* * * * *